United States Patent [19]

Gonzalez

[11] Patent Number: 5,407,171
[45] Date of Patent: *Apr. 18, 1995

[54] ADJUSTABLE AIR HANDLER BASE ASSEMBLY

[76] Inventor: Isidro Gonzalez, 8280 N.W. 64th St., Miami, Fla. 33166

[ * ] Notice: The portion of the term of this patent subsequent to May 3, 2011 has been disclaimed.

[21] Appl. No.: 195,108

[22] Filed: Feb. 14, 1994

Related U.S. Application Data

[63] Continuation-in-part of Ser. No. 40,041, Mar. 30, 1993, Pat. No. 5,308,037.

[51] Int. Cl.⁶ .............................................. F16M 3/00
[52] U.S. Cl. .................................. 248/670; 248/676; 248/678
[58] Field of Search ............... 248/670, 676, 675, 678, 248/673, 150, 166, 172, 146, 176; 62/297; 5/200.1, 201, 202, 312; 211/195, 175

[56] References Cited

U.S. PATENT DOCUMENTS

| Re. 12,973 | 6/1909 | Hendricks | 248/676 X |
|---|---|---|---|
| 872,848 | 12/1907 | Repp | 248/676 |
| 2,772,424 | 12/1956 | Roche | 5/200.1 X |
| 4,971,286 | 11/1990 | Silhan | 248/676 |
| 5,238,215 | 8/1993 | Jeker et al. | 248/678 |
| 5,308,037 | 5/1994 | Gonzalez | 248/670 |

FOREIGN PATENT DOCUMENTS

| 0940016 | 12/1948 | France | 248/676 |
|---|---|---|---|
| 0098314 | 1/1961 | Netherlands | 248/676 |

*Primary Examiner*—Ramon O. Ramirez
*Attorney, Agent, or Firm*—J. Sanchelima

[57] ABSTRACT

A base assembly for air handlers for air conditioning systems to support them at a spaced apart relationship from the floor to permit air in. The base assembly has two supporting assemblies that are separate, parallel to each other and being connected by horizontally disposed extending members that telescopically adjust that separation to cooperate with the dimensions of the air handler. The supporting assemblies include supporting sub-assemblies that have substantially a rectangular shape framed with elongated member to which legs have been rigidly mounted at the ends and the other ends of the legs are connected by bracing members. Arm members can be swung to align the arms with the supporting assemblies, thereby providing a volumetrically efficient base when in storage and sturdy enough to support heavy air handlers. A guide for the air handler's filter is provided at the upper plane of the supporting assemblies.

3 Claims, 1 Drawing Sheet

ADJUSTABLE AIR HANDLER BASE ASSEMBLY

OTHER RELATED APPLICATIONS

The present application is a continuation-in-part of (allowed and) U.S. patent application Ser. No. 08/040,041, filed on Mar. 30, 1993, now U.S. Pat. No. 5,308,037 which is hereby incorporated by reference.

BACKGROUND OF THE INVENTION

1. Field of the Invention

The present invention relates to a base for an air conditioner handler. Air conditioning handlers are typically mounted in closed quarters, more than likely inside a closet, and in most instances in an upright position. Air handlers are designed with either a built-in filter track or not. With either type, the air handler requires a clearance at its lower end to permit unobstructed air intake. A base for the air handler is, in many instances, built on site depending on the characteristics of the place where it is going to be mounted. However, the need for a base that can be utilized with both air handlers and that is compatible with the constrained space requirements where these devices are placed is quite apparent.

2. Description of the Related Art

Applicant believes that the closest reference corresponds to Roche U.S. Pat. No. 2,772,424 and entitled "Bedframe Support Leg". However, it differs from the present invention because it does not provide the features required by an air handler, i.e. clearance of air intake nor the guide for the insertion and removal of filters.

The invention disclosed in the parent application fails to disclose the supporting frame members for each one of the assemblies. Instead, the parent application discloses supporting members 30 and 30' that include leg members 32; 32' and arm members 34 and 34', perpendicular to each other. The frame members have shown to withstand considerable more weight without substantially affecting the volumetric efficient design of the assembly.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a base for air conditioner handlers that can be adapted to keep the latter suspended at a spaced apart separation from the ground to permit the air to flow in.

It is an object of the present invention to provide an air handler that is sturdy and capable to support heavy air handlers.

It is another object of this invention to provide such a base that can be folded, transported and stored in a volumetrically efficient manner.

It is still another object of this invention to provide an air handler base that fits most air handler units with disregard to the manufacturing entity.

Another object of this invention is to provide a filter track that facilitates the replacement of filters when the track is not a built-in feature of the air handler.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
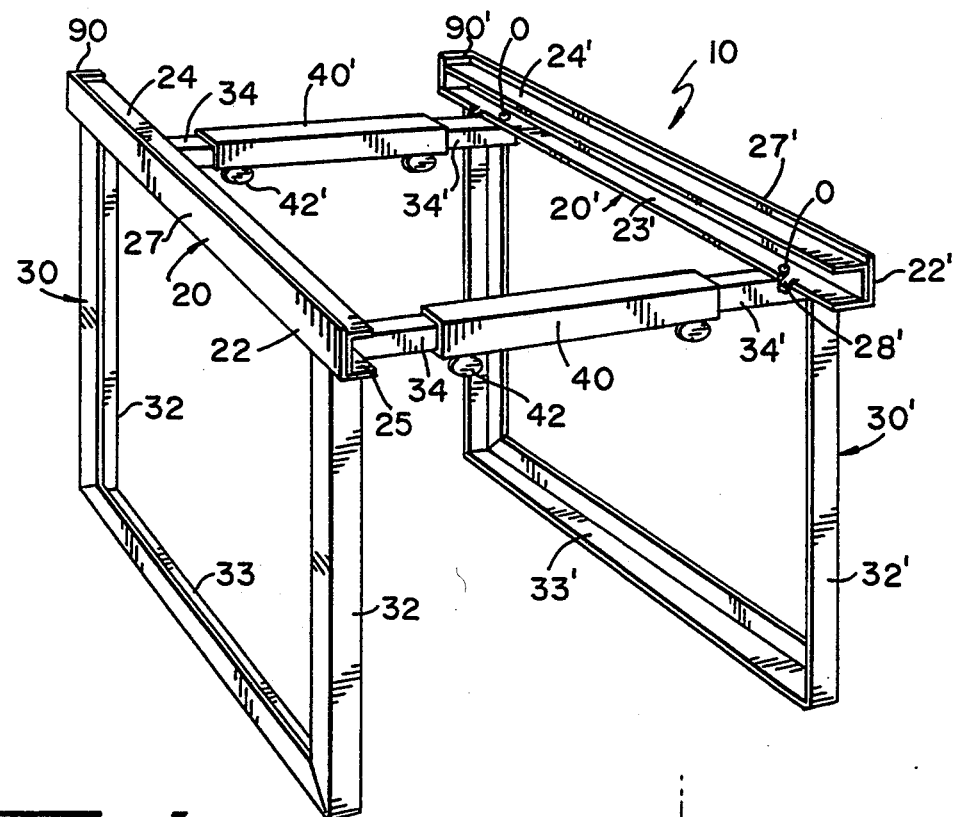
FIG. 1 provides an isometric view of the different components of the base assembly.
Figure 3:
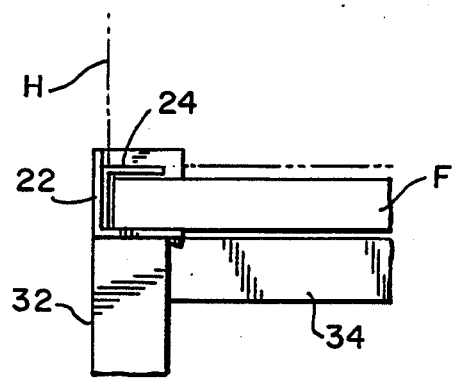
FIG. 3 is a partial cross-section of one of the corners of the base assembly and filter.
Figure 2:
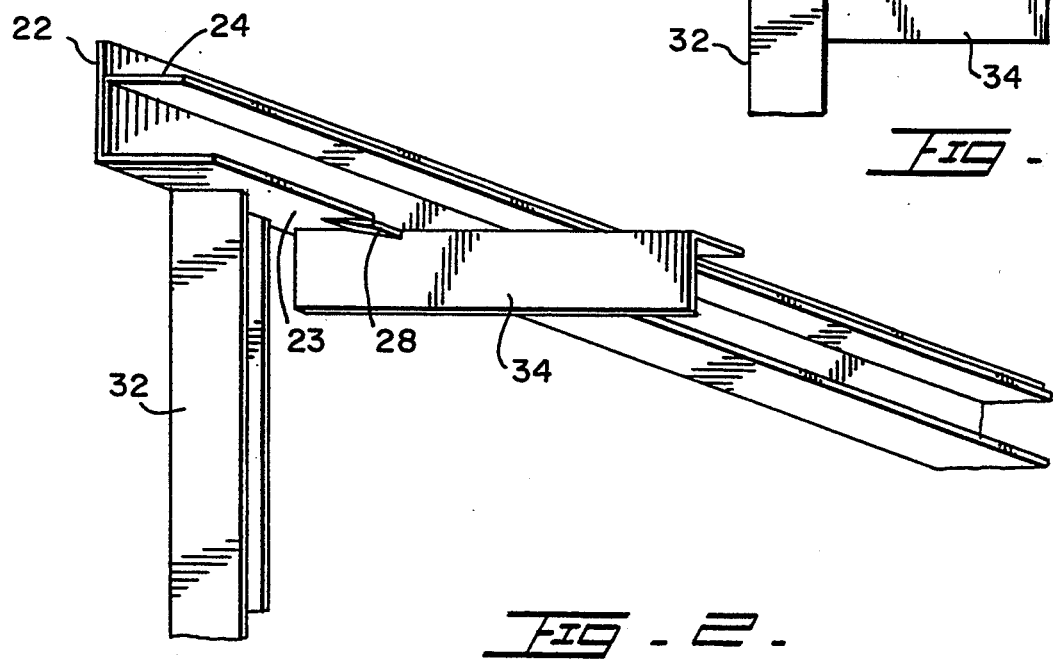
FIG. 2 is a partial detailed view of the corners of the base assembly as seen from below.

Referring now to the drawings, where the present invention is generally referred to with numeral 10, it can be observed that it basically includes side assemblies 20 and 20' and extending members 40 and 40'. The base assembly 10 does not require the use of any tools whatsoever nor does it require soldering or nailing.

As it can be seen from FIG. 1, side assembly 20 comprises an elongated member 22 having an L-shaped cross section. A similar, yet not as wide, elongated member 24 extends coaxially and over substantially the same distance as elongated member 22. Member 24 has also an L-shaped cross-section and it is, in the preferred embodiment, soldered to member 22 so that a guiding channel 25 is defined by members 22 and 24. This channel 25 is designed to receive conventional air filter F typically used with air handler H and that require periodic maintenance (removal).

Supporting frame members 30 and 30' are rigidly mounted to the underside of elongated members 22 and 22'. Supporting frame members 30 and 30' define a substantially rectangle shaped frame with elongated members 22 and 22'. Legs 32 and 32' are joined by bracing members 33 and 33' at the bottom ends of legs 32 and 32'. Legs 32 and 32' and bracing members 33 and 33' of supporting frame members 30 and 30' have an L-shaped cross-section.

Arm members 34 and 34' can be pivoted and aligned below members 22 and 22'. Extending members 40 and 40' have a rectangular (or in the preferred embodiment square) cross-section and they receive members 34 and 34' in a telescopic fashion. Extending members 40 and 40' include thumb screws 42 and 42' that permit members 34; 34' and 40; 40' to be secured in a fixed relationship to each other at a selected point that will dictate the separation of assemblies 20 and 20'. Stopper members 28 and 28' are built on elongated members 22 and 22' on each one of the corners of assembly 10 to limit the swing or pivot action of members 34 and 34' around joint "O". Stopper members 28 and 28' are, in the preferred embodiment, formed with two incisions on lower angular wall 23, substantially towards the ends of members 22 and 22'. It is important to note that when stopper members 28 and 28' are designed to prevent members 34 and 34' to pivot more than 90 degrees, the resulting frame defined by elongated members 22 and 22'; members 24 and 24', extending members 40 and 40' and arm members 34 and 34'.

Angular wall 27 and 27' of member 22 is bent at 90 degrees at the rear end. Angular wall 23 and 23' is notched with a 90 degree cut and folded inwardly. The resulting cap wall 90 and 90' limit the rear travel of filter F and air handler H.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A base assembly for air handlers having a filter, comprising:

A. first supporting means having a rectangular shape including first elongated means having an underside and two ends, and said first supporting means further including a first and second leg members having each two ends and one the ends of each of said leg members being rigidly mounted to the underside of said first elongated means substantially close to the ends of said first elongated means, said first supporting means further including first bracing member rigidly connected to the free ends of said first and second leg members, and said first supporting means further including a pair of first arm members pivotally mounted to the underside of said first elongated means substantially at the ends thereof so that said first arm members can be pivoted from below said first elongated means to a position perpendicular thereto, and said first elongated means further including first and second members with an L-shaped cross-section thereby providing a cooperative surface to support said air handler and defining a channel for cooperatively receiving said filter;

B. second supporting means having a rectangular shape including second elongated means having an underside and two ends, and said second supporting means further including a third and fourth leg members having each two ends and one the ends of each of said leg members being rigidly mounted to the underside of said first elongated means substantially close to the ends of said second elongated means, said second supporting means further including second bracing member rigidly connected to the free ends of said third and fourth leg members, and said first supporting means further including a pair of second arm members pivotally mounted to the underside of said first elongated means substantially at the ends thereof so that said first arm members can be pivoted from below said first elongated means to a position perpendicular thereto and said first elongated means further including third and fourth members with an L-shaped cross-section thereby providing a cooperative surface to support said air handler and defining a channel for cooperatively receiving said filter; and C. two spacer means for receiving said first and second arm members from said first and second elongated means thereby forming a supporting frame at a spaced apart relationship from the plane where said first and second supporting frame members rest.

2. The base set forth in claim 1 wherein said first and second elongated means include stopper means for preventing said arm members from pivoting beyond a position perpendicular to said first and second elongated means, respectively, thereby locking said resulting frame rigidly.

3. The base assembly set forth in claim 2 wherein said spacer means includes locking means for keeping said spacer means at a fixed position with respect to said arms.

* * * * *